US006975677B2

(12) United States Patent
Matsumoto

(10) Patent No.: US 6,975,677 B2
(45) Date of Patent: *Dec. 13, 2005

(54) DIGITAL COMMUNICATION DEVICE

(75) Inventor: Wataru Matsumoto, Tokyo (JP)

(73) Assignee: Mitsubishi Denki Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 655 days.

(21) Appl. No.: 09/445,298

(22) PCT Filed: Mar. 3, 1999

(86) PCT No.: PCT/JP99/01622

§ 371 (c)(1),
(2), (4) Date: Dec. 3, 1999

(87) PCT Pub. No.: WO99/53626

PCT Pub. Date: Oct. 21, 1999

(65) Prior Publication Data

US 2003/0190000 A1 Oct. 9, 2003

(30) Foreign Application Priority Data

Apr. 10, 1998 (JP) .............................. 10-98609
Jun. 26, 1998 (JP) .......................... 10-180174

(51) Int. Cl.[7] ................................................ H03H 7/40
(52) U.S. Cl. ...................................... 375/232; 375/229
(58) Field of Search ................................ 375/220, 222, 375/14, 229, 230, 231, 233, 234, 235, 236, 232; 379/417; 325/40; 370/286; 333/28 R

(56) References Cited

U.S. PATENT DOCUMENTS

| 4,112,370 | A | * | 9/1978 | Monsen ........................ 325/40 |
| 5,163,066 | A | * | 11/1992 | Cupo et al. .................... 375/14 |
| 6,317,495 | B1 | * | 11/2001 | Gailwad et al. ............. 379/417 |
| 6,400,781 | B1 | * | 6/2002 | Vandendorpe et al. ...... 375/350 |
| 6,463,041 | B1 | * | 10/2002 | Agazzi ........................ 370/286 |

FOREIGN PATENT DOCUMENTS

| JP | A3-226134 | 10/1991 |
| JP | A3-278742 | 12/1991 |
| JP | A7-321767 | 12/1995 |
| JP | A10-303872 | 11/1998 |

OTHER PUBLICATIONS

"A Study on ADSL System for TCM–ISDN Crosstalk", collected papers for the Convention of the Conference on Electronics, Information, and Communication on 1998, Communication 2, Mar. 6, 1998, p. 403, Hiroshi Okado, et al.

(Continued)

Primary Examiner—Stephen Chin
Assistant Examiner—Sam K. Ahn
(74) Attorney, Agent, or Firm—Birch, Stewart, Kolasch & Birch, LLP

(57) ABSTRACT

An ADSL remote terminal end transceiver unit synchronizes transmission of upstream and downstream data between TCM-ISDN communication and ADSL communication, and in addition, provides NEXT tables (155, 157) and FEXT tables (154, 156), in which are stored equalizing coefficients appropriate for a NEXT noise and a FEXT noise generated when data travel upstream and downstream in TCM-ISDN communication, to equalizers TEQ (142) and FEQ (145) of the ADSL remote terminal end transceiver unit. As a consequence, even when the FEXT noise and the NEXT noise are generated one after another in TCM-ISDN communication, the TEQ (142) and the FEQ (145) can switch between the NEXT table and the FEXT table, achieving TEQ and FEQ characteristics which are most appropriate for the respective noises.

18 Claims, 10 Drawing Sheets

OTHER PUBLICATIONS

"Equalizer Training Algorithm for DMT Modulation SYstem", collected papers for the Convention of the Conference on Electronics, Information, and Communication on 1998, Communication 2, Mar. 6, 1998, p. 402, Katsutoshi Seki, et al.

"Proposed ANNEX C of G. dmt, ASDL under TCM–ISDN noise environment" NEC, ITU–T SG15 Q4 D. 156 (WP1/15) Geneva, 9–20.

* cited by examiner

DIGITAL COMMUNICATION DEVICE

This application is the national phase under 35 U.S.C. § 371 of PCT International Application No. PCT/JP99/01622 which has an International filing date of Mar. 3, 1999, which designated the United States of America.

TECHNICAL FIELD

The present invention relates to a digital communication device. More particularly, this invention relates to a digital communication device such as an xDSL communication modem or an xDSL communication device, which, when receiving data, optimally corrects transmission path characteristics comprising noise transmitted from multiple half-duplex communication devices, transmitting via a half-duplex transmission path.

BACKGROUND ART

Recently, an ADSL (Asymmetric Digital Subscriber Line) communication system, an HDSL (High-rate Digital Subscriber Line) communication system, an xDSL communication device system such as an SDSL, which perform high-speed digital transmission of several megabits/second using an existing copper cable for telephone, are attracting attention as cable digital communication systems. The xDSL communication system used in these is known as a DMT (Discrete MultiTone) variable demodulation system. This system is standardized in T1.413 of ANSI and elsewhere.

In this digital communications system, when an xDSL transmission path and an ISDN transmission path of an ISDN communications system, which is a half-duplex communications system, are adjacent to each another when for instance they are converged together or the like in a midway collection guide, an xDSL transmission along the xDSL transmission path is affected by interference noise from other circuits such as the ISDN transmission path, leading to problems such as a loss of speed. Various countermeasures have been adopted.

FIG. 10 shows interference noise from an ISDN transmission path 2 from a central office (CO) 1 affecting an ADSL transmission path 3 which is an xDSL transmission path, when the ISDN transmission path 2 and the ADSL transmission path are converged together or the like midway at a collection guide.

Here, when seen from the ADSL remote terminal end transceiver unit (ATU-R) 4, which is a communication device at the terminal side of the ADSL communication system side, the interference noise transmitted through the ADSL transmission path 3 by the office side device (ISDN LT) 7 on the ISDN transmission system side is called FEXT (Far-End Cross Talk), and the interference noise transmitted through the ADSL transmission path 3 by the terminal device (ISDN NT1) 6 on the ISDN transmission system side is called NEXT (Near-end cross talk). In particular, a midway collection guide or the like causes coupling between the ADSL transmission path 3 and the ISDN transmission path 2, which becomes adjacent to the ADSL transmission path 3, whereby the noise is transmitted through the ADSL transmission path 3 to the ADSL terminal side device (ATU-R) 4.

When seen from the ADSL central office end transceiver unit (ATU-C) 5, which is an office side device on the ADSL communication system side, contrary to the case seen from the ADSL remote terminal end transceiver unit (ATU-R) 4, the interference noise transmitted by the central office end device (ISDN LT) 7 on the ISDN transmission system side is a NEXT noise, and the interference noise transmitted by the terminal device (ISD NNT1) 6 on the ISDN transmission system side is a FEXT noise.

Here, in overseas ISDN communication systems, all upstream and downstream transmissions are duplex transmissions and carried out simultaneously. Therefore, when seen from the ADSL remote terminal end transceiver unit (ATU-R) 4, the NEXT noise generated from the terminal device (ISDN NT1) 6 on the ISDN transmission system side which is nearer to the ADSL remote terminal end transceiver unit (ATU-R) 4, is dominant, is dominant, that is, its effects are considerable.

Consequently, during the training time of an ADSL modem (not shown in the diagram) provided to the ADSL remote terminal end transceiver unit (ATU-R) 4, training is carried out while both the FEXT noise and the NEXT noise are being generated at the same time, and the characteristics of the NEXT noise components with a large influence is measured. A bit map is then made to determine the gain and number of transmission bits in each channel suitable for characteristics of the noise. In addition, to improve the transmission characteristics, coefficients for a Time domain Equalizer (TEQ), to perform time domain equalization processing, and a Frequency domain Equalizer (FEQ), to perform frequency domain equalization processing, are for instance converged and determined, and one coefficient table is provided for the TEQ and the FEQ respectively.

As a result such problems are not caused for overseas digital communications devices as mentioned above. However, TCM-ISDN systems performing half-duplex communication known as Ping-Pong systems, wherein upstream and downstream data transmissions are switched by time division, are used as existing ISDN communication systems in countries such as Japan. Consequently, when the half-duplex transmission path is adjacent to another transmission path in a collection guide or the like, the NEXT noise and the FEXT noise from the half-duplex transmission path affect the communication terminal connected to the other transmission path adjacent to the half-duplex transmission path.

For this reason, when a half-duplex communication system such as a Japanese TCM-ISDN system is used, an ADSL terminal side device (ATU-R) capable of handling entirely half-duplex ISDN communication systems of overseas countries and the like installs only one coefficient table trained under the situation where both the FEXT noise and the NEXT noise are being generated at the same time, and upstream and downstream communications on the ISDN transmission path are time-divided by a TCM system. Therefore, even when the noise components affecting the terminal connected to the transmission path adjacent to the ISDN transmission path are switched to the NEXT noise and the FEXT noise, since these are gathered together in a single coefficient table it tries to settle to one coefficient table. Whenever the amount of the noise and the change in the character took place, the amount of error at the terminal worsens, the speed at which the amount of error can be improved is slowed, and other problems arise.

In the light of the problems described above, it is an object of the present invention to provide a digital communication system which can improve the influence by the noise, even when interference noise is received from a half-duplex transmission path for TCM-ISDN communication and the like via a digital transmission path adjacent thereto, and extend communication processing in each transmission rate, and, in addition, improve the transmission rate in the service area.

DISCLOSURE OF THE INVENTION

To achieve the above objects, in the present invention, a digital communications device for optimally correcting transmission path characteristics containing noise transmitted from a plurality of half-duplex communication devices via a half-duplex transmission path, comprising; a NEXT noise coefficient table, in which are stored equalizing coefficients of equalizers for optimally correcting characteristics of a transmission path containing a NEXT noise transmitted from a near-end half-duplex communication device that is on side near to a main device among the plurality of half-duplex communication devices; a FEXT noise coefficient table, in which are stored equalizing coefficients of equalizers to optimally correct characteristics of a transmission path containing a FEXT noise transmitted from a is far-end half-duplex communication device that is on side far from the main device among the plurality of half-duplex communication devices; and equalizers for correcting transmission path characteristics based on the equalizing coefficients in the NEXT noise coefficient table when the FEXT noise has been transmitted from the near-end half-duplex communication device, and on the other hand, for correcting transmission path characteristics based on the equalizing coefficients in the FEXT noise coefficient table when the FEXT noise has been transmitted from the far-end half-duplex communications device.

In the next aspect of the invention, the device is characterized in that it is a terminal end device for transmitting after synchronizing communications between the half-duplex communications devices, and when the NEXT noise has been transmitted from the near-end half-duplex communication device on a terminal end while data is travelling upstream on the half-duplex transmission path from a terminal end to a central office end, the transmission path characteristics are corrected based on equalizing coefficients in the NEXT noise coefficient table applied to the equalizers, and, on the other hand, when the FEXT noise has been transmitted from the far-end half-duplex communication device on the central office end while data is travelling downstream on the half-duplex transmission path from the central office end to the terminal end, the transmission path characteristics are corrected based on equalizing coefficients in the FEXT noise coefficient table applied to the equalizers.

In the next aspect of the invention, the device is characterized in that it is a central office end device for transmitting after synchronizing communications between the half-duplex communication devices, and when the NEXT noise has been transmitted from the near-end half-duplex communication device on the central office end while data is travelling downstream on the half-duplex transmission path from a central office end to a terminal end, the transmission path characteristics are corrected based on equalizing coefficients in the NEXT noise coefficient table applied to the equalizers, and, on the other hand, when the FEXT noise has been transmitted from the far-end half-duplex communication device on the terminal end while data is travelling upstream on the half-duplex transmission path from the terminal end to the central office end, the transmission path characteristics are corrected based on equalizing coefficients in the FEXT noise coefficient table applied to the equalizers.

In the next aspect of the invention, the device is characterized in that it further comprises a detecting and determining section for detecting the noise transmitted from the half-duplex communication device, and determining whether it is the NEXT noise or the FEXT noise; wherein, based on a determination output from the detecting and determining section, in the case of the NEXT noise, the equalizers correct the transmission path characteristics based on equalizing coefficient from the NEXT noise coefficient table, and in the case of the FEXT noise, the equalizers correct the transmission path characteristics based on equalizing coefficient from the FEXT noise coefficient table.

In the next aspect of the invention, the device is characterized in that, prior to communication, it determines filter coefficients to converge the transmission functions of the noise, using predetermined data in frames transmitted between the plurality of half-duplex communications devices, the data having a pre-identified pattern and generation timing, and at transmission, it creates a replica of the predetermined data affected by the noise using the converged filter coefficient during the generation timing of the predetermined data, and subtracts the replica from the received signal.

In the next aspect of the invention, the device is characterized in that the half-duplex transmission path is a TCM-ISDN transmission path, the plurality of half-duplex communication devices transmit TCM-ISDN communication via the TCM-ISDN transmission path, and the main device transmits ADSL communication via an ADSL transmission path.

In the next aspect of the invention, the device is characterized in that, when receiving data, characteristics of a transmission path containing noise transmitted from a plurality of half-duplex communication devices transmitting via half-duplex transmission paths; comprising a FEXT noise coefficient table, in which are stored equalizing coefficients of equalizers to optimally correct characteristics of a transmission path containing a FEXT noise transmitted from a far-end half-duplex communication device that is on side far from a main device among the plurality of half-duplex communication devices; and equalizers for correcting transmission path characteristics based on equalizing coefficient in the FEXT noise coefficient table when a NEXT noise has been transmitted from a near-end half-duplex communications device, being one of the plurality of half-duplex communications devices, which is near to the main device, and when the FEXT noise has been transmitted the far-end half-duplex communications device.

In the next aspect of the invention, the device is characterized in that it is a terminal end device for transmitting after synchronizing communications between the half-duplex communications devices, and when the NEXT noise has been transmitted from the near-end half-duplex communication device on a terminal end while data is travelling upstream on the half-duplex transmission path from a terminal end to a central office end, it corrects transmission path characteristics based on equalizing coefficients in the FEXT noise coefficient table applied to the equalizers, and, on the other hand, when the FEXT noise has been transmitted from the far-end half-duplex communication device on the central office end while data is travelling downstream on the half-duplex transmission path from the central office end to the terminal end, the device corrects the transmission path characteristics based on equalizing coefficients in the FEXT noise coefficient table applied to the equalizers.

In the next aspect of the invention, the device is characterized in that it is a central office end device for transmitting after synchronizing communications between the half-duplex communication devices, and when the NEXT noise has been transmitted from the near-end half-duplex communication device on the central office end while data is travelling downstream on the half-duplex transmission path from a central office end to a terminal end, the device corrects transmission path characteristics based on equalizing coefficients in the FEXT noise coefficient table applied to the equalizers, and, on the other hand, when the FEXT noise has been transmitted from a far-end half-duplex communication device on the terminal end while data is travelling upstream on the half-duplex transmission path from the terminal end to the central office end, the device corrects transmission path characteristics containing the FEXT noise based on equalizing coefficients in the FEXT noise coefficient table applied to the equalizers.

In the next aspect of the invention, the device is characterized in that it further comprises a detecting and determining section for detecting the noise transmitted from the half-duplex communication device, and determining whether it is the NEXT noise or the FEXT noise; wherein, based on a determination output from the detecting and determining section, the equalizers optimally correct the transmission path characteristics based on equalizing coefficient from the FEXT noise coefficient table in the case of the NEXT noise and also in the case of FEXT noise.

In the next aspect of the invention, the device is for optimally correcting, when receiving data, characteristics of a transmission path containing noise transmitted from a plurality of half-duplex communication devices transmitting via half-duplex transmission paths a FEXT noise coefficient table, in which are stored equalizing coefficients of equalizers to optimally correct characteristics of a transmission path containing FEXT noise transmitted from a far-end half-duplex communication device that is on side far from a main device among the plurality of half-duplex communication devices; equalizers for correcting transmission path characteristics containing the FEXT noise based on equalizing coefficient in the FEXT noise coefficient table; and the device receiving data only while the FEXT noise is being transmitted.

In the next aspect of the invention, the device is characterized in that it is a terminal end device for transmitting after synchronizing communications between the half-duplex communications devices, and during a period when the NEXT noise is transmitted from the near-end half-duplex communications device on a terminal end while data is travelling upstream on the half-duplex transmission path from a terminal end to a central office end, the device does not receive data, and, on the other hand, during a period when the FEXT noise is transmitted from the far-end half-duplex communications device on the central office end while data is travelling downstream on the half-duplex transmission path from the central office end to the terminal end, the device receives a data transmission, and in addition, optimally corrects the transmission path characteristics containing the FEXT noise based on equalizing coefficients in the FEXT noise coefficient table applied to the equalizers.

In the next aspect of the invention, the device is characterized in that it is a central office end device for transmitting after synchronizing communications between said half-duplex communication devices, and during a period when the NEXT noise is transmitted from said near-end half-duplex communication device on the central office end while data is travelling downstream on said half-duplex transmission path from a central office end to a terminal end, said device does not receive data, and on the other hand, during a period when the FEXT noise is transmitted from said far-end half-duplex communication device on the terminal end while data is travelling upstream on said half-duplex transmission path from the terminal end to the central office end, said device receives data, and in addition, corrects transmission path characteristics containing the FEXT noise based on equalizing coefficients in said FEXT noise coefficient table applied to said equalizers.

In the next aspect of the invention, the device is characterized in that it further comprises a detecting and determining section for detecting the noise transmitted from the half-duplex communication device, and determining whether it is in a FEXT noise domain; wherein, based on a determination output from the detecting and determining section, in the case of the FEXT noise, the equalizers optimally correct the transmission path characteristics based on equalizing coefficient from the FEXT noise coefficient table.

BRIEF DESCRIPTION OF THE DRAWINGS

FIG. 10 shows the state of interference noise that an ISDN transmission path gives to an ADSL transmission path, when the ISDN transmission path and the ADSL transmission path converge in a collection guide or the like.

BEST MODE FOR CARRYING OUT THE INVENTION

Figure 1:
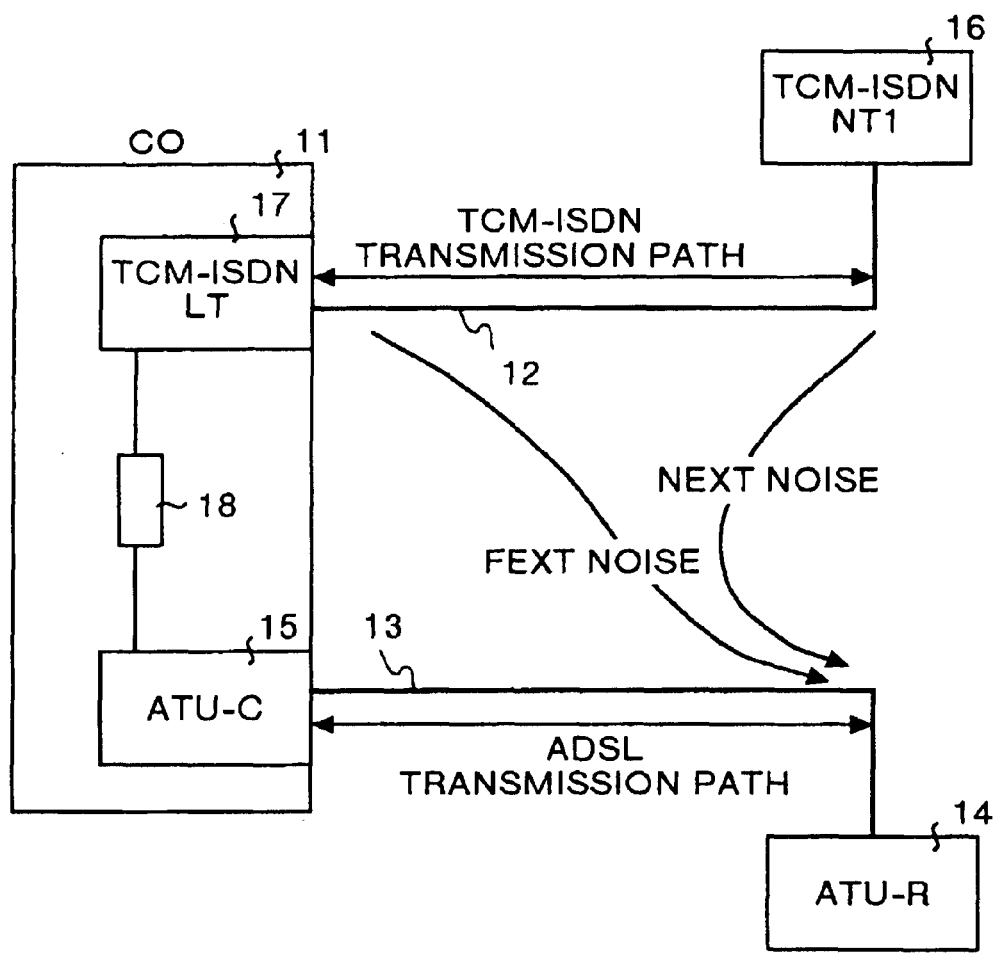
FIG. 1 shows the outline and the like of a digital communication system for which a digital communication device of the present invention is used.

A first embodiment of a digital communication device of the present invention will be explained below referring to the drawings.

In the following embodiment, a half-duplex communication device at the end applying interference noise is assumed to perform TCM-ISDN communication in which time-division half-duplex communication are transmitted along a half-duplex transmission path. As a result, the digital communication device at the end applying interference noise is assumed to perform ADSL communications, which is a type of xDSL communications system.

FIG. 1 shows a summary of a digital communications system using a digital communications device of the present invention.

In FIG. 1, 11 is a central office (CO) for controlling TCM-ISDN communication, ADSL communication, and the like, 12 is a TCM-ISDN transmission path for carrying out TCM-ISDN communication, 13 is an ADSL transmission path for carrying out ADSL communication, 14 is an ADSL Remote Terminal Transceiver Unit (ATU-R) 14 such as a communication modem for exchanging ADSL communication via the ADSL transmission path 13 with another ADSL Remote Terminal Transceiver Unit (not shown in the diagram), 15 is an ADSL Transceiver Unit, Central Office end (ATU-C) for controlling ADSL communication in the central office 11, 16 is a TCM-ISDN terminal end device (TCM-ISDN NT1), such as a communication modem, for exchanging TCM-ISDN communication via the TCM-ISDN transmission path 12 with another TCM-ISDN remote terminal end transceiver unit (not shown in the diagram), 17 is a central office end transceiver unit (TCM-ISDN LT) for controlling TCM-ISDN communication in the central office 11, and 18 is a synchronism controller for synchronizing communication between the TCM-ISDN central office end transceiver unit (TCM-ISDN LT) 17 and the ADSL central office end transceiver unit (ATU-C) 15. Unlike the case shown in FIG. 1, this synchronism controller 18 is may of course be provided in the TCM-ISDN central office end transceiver unit (TCM-ISDN LT) 17, or in the ADSL central office end transceiver unit (ATU-C) 15.

As explained in the background art, when seen from the ADSL remote terminal end transceiver unit (ATU-R) 14, as shown in FIG. 1, the interference noise which the TCM-ISDN central office end transceiver unit (TCM-ISDN LT) 17 as a far-end half-duplex communication device transmits through the TCM-ISDN transmission path 12 and the ADSL transmission path 13 that are provided adjacent by a collection guide or the like, is called "FEXT noise". On the other hand, the interference noise which the TCM-ISDN remote terminal end transceiver unit (TCM-ISDN NT1) 16 as a near-end half-duplex communication device transmits through the TCM-ISDN transmission path 12 and the ADSL transmission path 13 that are provided adjacent by a collection guide or the like, is called "NEXT noise".

On the contrary, when seen from the ADSL central office end transceiver unit (ATU-C) 15, contrary to when seen from the ADSL remote terminal end transceiver unit (ATU-R) 14, the interference noise which the ISDN central office end transceiver unit (ISDN LT) as a distant half-duplex communications device transmits is called as the NEXT noise. Similarly, the interference noise which the ISDN terminal end transceiver unit (ISDN NT1) as a near-end half-duplex communications device transmits is called as the FEXT noise.

Figure 2:
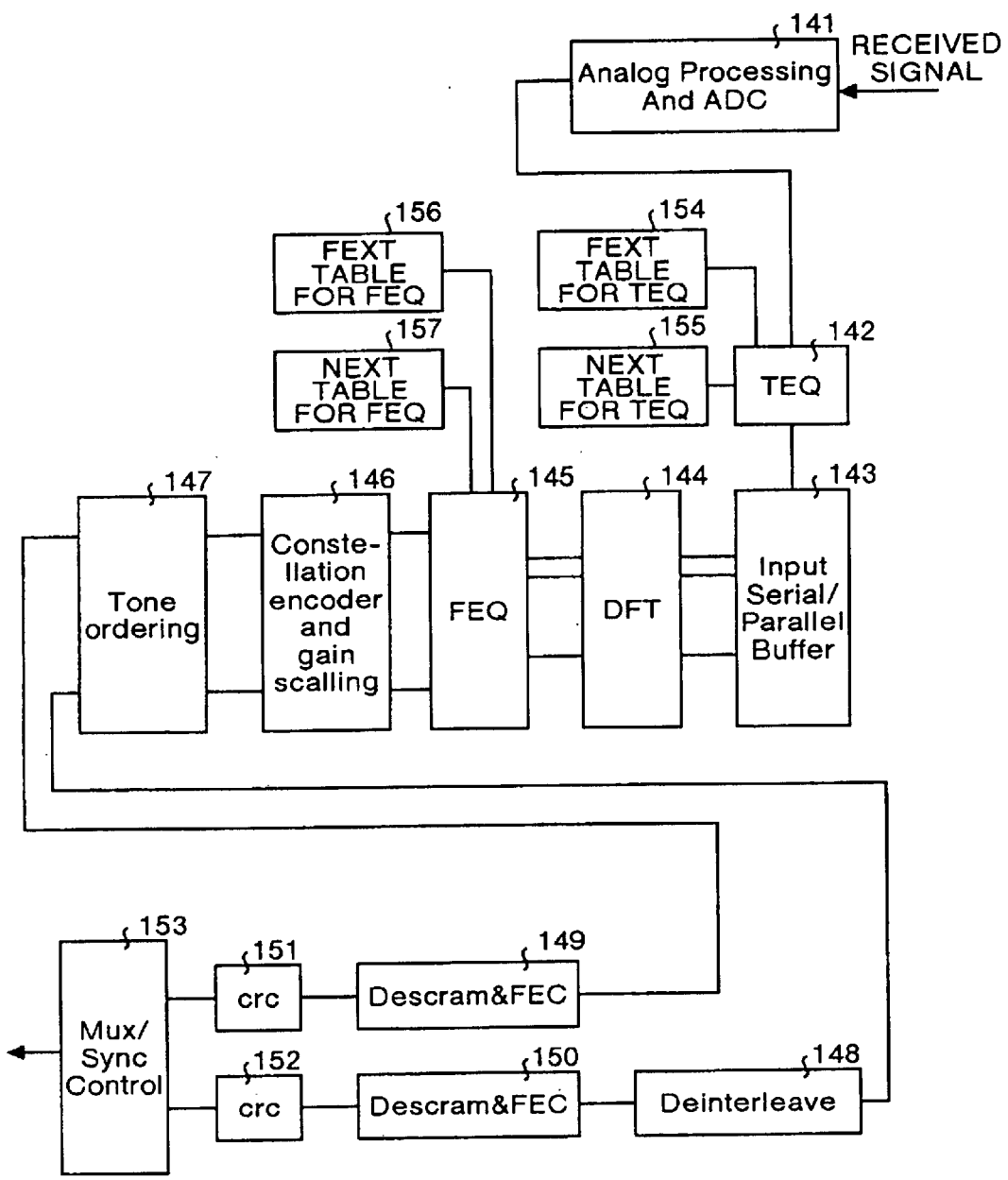
FIG. 2 shows a constitution of a receiver system of an ADSL remote terminal end transceiver unit (ATU-R) 14 according to a first embodiment of the digital communications device of the present invention.

FIG. 2 functionally shows a constitution of a receiver section or a receive only machine (hereinafter abbreviated as reception system), such as a communication modem and the like, of the ADSL remote terminal end transceiver unit (ATU-R) 14 according to the first embodiment of the digital communications device of the present invention.

In this figure, 141 is an analog processing and ADC; 142 is a time domain equalizer (TEQ); 143 is an input serial/parallel buffer; 144 is a discrete Fourier transformer (DFT); 145 is a frequency domain equalizer (FEQ); 146 is a constellation encoder and gain scalling; 147 is a tone ordering; 148 is a deinterleave; 149 and 150 are descramble and forward error corrections (Descram and FEC); 151 and 152 are cyclic redundancy checks (crc); and 153 is a Mux/Sync Control.

Furthermore, 154 is a FEXT table for TEQ for providing a coefficient for the FEXT noise to the time domain equalizer (TEQ) 142; 155 is a FEXT table for TEQ for providing a coefficient for the NEXT noise to the time domain equalizer (TEQ) 142; 156 is a FEXT table for FEQ for providing a coefficient for the FEXT noise to the frequency domain equalizer (FEQ) 145; and 157 is a NEXT table for FEQ for providing a coefficient for the NEXT noise to the frequency domain equalizer (FEQ) 145.

These tables 154 to 157 store separate equalizing coefficients which the FEXT noise and the NEXT noise settle respectively separately and promptly, by equalizing the noise characteristics on the ADSL remote terminal end transceiver unit (ATU-R) 14 side synchronizing with upstream and out-coming data in the TCM-ISDN communication at the time domain equalizer (TEQ) 142 and the frequency domain equalizer (FEQ) 145, during training time and the like prior to commencing ADSL communication.

Next, operation will be explained. First of all, the operation of the reception system of the ADSL remote terminal end transceiver unit (ATU-R) 14 according to the first embodiment is briefly explained. The analogue processing and A/D converter 141 applies an LPF to the received signal, and the signal passing through the A/D converter 141 is converted from an analog signal to a digital signal, and is then time-equalized by the time domain equalizer (TEQ) 142.

Next, the data that the time domain equalization is converted from serial data to parallel data by the input serial/parallel buffer 143. Then, the data is discrete Fourier-converted by the discrete Fourier converter (DFT) 144, and is frequency domain equalized by the frequency domain equalizer (FEQ) 145.

Then, the constellation encoder and gain scalling 146 reproduces the constellation data. The Tone ordering 147 converts it to serial data, the Descram and FEC 149 carries out FEC or descramble processing, the deinterleave 148 is applied if necessary, the descramble and forward error correction 150 carries out FEC and descramble processing; thereafter, cyclical redundancy checks 151 and 152 are performed, and the data is reproduced by the Mux/Sync Control 153.

At this point, in the central office (CO) 11, the synchronism controller 18 synchronizes the transmission times of the TCM-ISDN central office end transceiver unit (TCM-ISDN LT) 17 and the ADSL central office end transceiver unit (ATU-C) 15, and consequently the ADSL remote terminal end transceiver unit (ATU-R) 14 is able to identify the timing of the NEXT noise and the FEXT noise.

That is, by the synchronization of the TCM-ISDN communication and the ADSL communication, the ADSL remote terminal end transceiver unit (ATU-R) 14 determines, during a predetermined period of upstream data on the TCM-ISDN transmission path 12 where the timing is known beforehand, that the NEXT noise is generated in the data and signals received via the ADSL transmission path 13; on the other hand, it can similarly determine, during a predetermined period of downstream data on the TCM-ISDN transmission path 12 where the timing is known beforehand, that the FEXT noise will be generated in the data and signals received via the ADSL transmission path 13.

Therefore, in the reception system of the first embodiment, it is determined that, during the predetermined period of up stream data on the TCM-ISDN transmission path 12, the NEXT noise is generated in the time domain equalizer (TEQ) 142 and the frequency domain equalizer (FEQ) 145, and, by using the equalizing coefficients of the NEXT table for TEQ 155 and the equalizing coefficients of the NEXT table for FEQ 157 respectively, and the transmission path characteristics are corrected in the time domain and the frequency domain.

On the other hand, it is determined that, during the predetermined period of downstream data on the TCM-ISDN transmission path 12, the FEXT noise is generated in the time domain equalizer (TEQ) 142 and the frequency domain equalizer (FEQ) 145, and, by using the equalizing coefficients of the FEXT table for TEQ 154 and the equalizing coefficient of the FEXT table for FEQ 156 respectively, and the transmission path characteristics including the FEXT noise in the time domain and the frequency domain are corrected best.

FIGS. 3(a) to (d) show transition and the like of amount of error when coefficient training is carried out while switching between the NEXT noise and the FEXT noise using the time domain equalizer (TEQ) 142 and the frequency domain equalizer (FEQ) 145.

Figure 3:
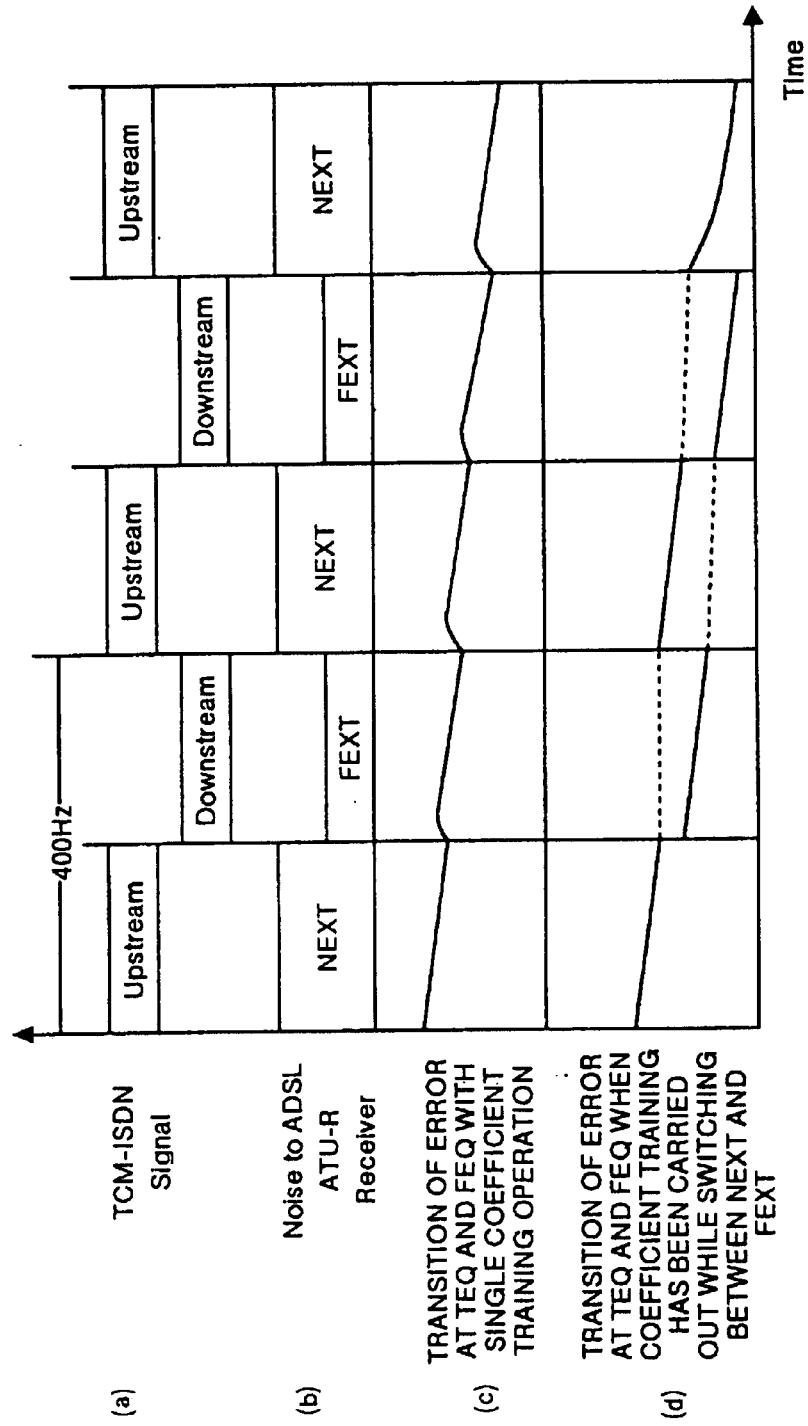
FIGS. 3(a) to (d) show the change and the like of the amount of error when carrying out coefficient training with a TEQ and an FEQ while switching between a NEXT noise and a FEXT noise according to the first embodiment.

FIG. 3(a) shows a flow of data on the TCM-ISDN transmission path 12, in a TCM-ISDN system having a cycle of 400 Hz and repeatedly switching between upstream and downstream.

FIG. 3(b) shows noise received at the ADSL remote terminal end transceiver unit (ATU-R) 14 via the ADSL transmission path 13. In the figure, it is shown that, the NEXT noise and the FEXT noise are alternately generated in synchronism with the upstream and downstream transmission of data on the TCM-ISDN transmission path 12.

FIG. 3(c) shows conventional transition of amount of error at the time domain equalizer (TEQ) 142 and the frequency domain equalizer (FEQ) 145 when training in both the NEXT noise period and the FEXT noise period using a single coefficient table.

In this case, since there is only one coefficient table, as shown in this figure, the NEXT noise and the FEXT noise are generated alternately as the data being transmitted on the TCM-ISDN transmission path 12 switches between upstream and downstream. Each time the noise type changes, the amount of error moving momentarily toward converging cannot be dealt with by one coefficient filter, consequently it will take time by the time the amount of error converges.

FIG. 3(d) shows the change of the amount of error in the time domain equalizer (TEQ) 142 and the frequency domain equalizer (FEQ) 145 when coefficient training is carried out by switching the coefficient filter from the NEXT tables 155 and 157, and the FEXT tables 154 and 156, in correspondence with each switch between the NEXT noise and the FEXT noise. In this case, since the TEQ 142 and the FEQ 145 together use the NEXT tables 155 and 157, and the FEXT tables 154 and 156, while the amount of error of the TEQ 142 and the FEQ 145 are converged by the NEXT tables 155 and 157 respectively for the NEXT noise; the amounts of error of the TEQ 142 and the FEQ 145 are converged by the FEXT tables 154 and 156 respectively for the FEXT noise.

Consequently, even when the NEXT noise and the FEXT noise of different characteristics, amounts and components are generated alternately, as shown in FIG. 3(d), the equalizing coefficients of the NEXT tables 155 and 157 and the FEXT tables 154 and 156, which are appropriate for each noise, can be used to separately equalize the FEXT noise and the NEXT noise as appropriate and separately converge the amount of error. Consequently, if the NEXT noise and the FEXT noise are separately seen, it can be understood that the amount of error faces convergence once, will converge gradually without improving, and, unlike the case shown in FIG. 3(c), it will possible to converge in a short time.

Therefore, according to the digital communication device of the first embodiment, since the tables 154 to 157 for NEXT noise and for FEXT noise are separately provided to the time domain equalizer (TEQ) 142 and the frequency domain equalizer (FEQ) 145, and equalizing coefficient corresponding to the FEXT noise and the NEXT noise is used during the training times of the TEQ 142 and the FEQ 145. Therefore, the optimum equalizing coefficient for the FEXT noise and the NEXT noise each can be determined in a shorter time than conventional systems. In addition, according to the first embodiment, the FEXT noise and the NEXT noise can be effectively eliminated from ADSL communication.

As a result, according to the first embodiment, the S/N ratio can be improved; the error generation probability falls; or the communication distance in each transmission rate of ADSL transmission can be extended. In addition, according to the first embodiment, the transmission rate in the service domain can be improved.

Furthermore, in the first embodiment, the synchronism controller 18 of the central office (CO) 11 synchronizes the transmission times of the TCM-ISDN central office end transceiver unit (TCM-ISDN LT) 17 and the ADSL central office end transceiver unit (ATU-C) 15. Consequently, the ADSL remote terminal end transceiver unit (ATU-R) 14 is able to switch between the NEXT tables 155 and 157, and the FEXT tables 154 and 156, even if the timing of the NEXT noise and the FEXT noise generation is not considered.

As mentioned above, the first embodiment describes a case where the present invention is applied to the ADSL remote terminal end transceiver unit (ATU-R) 14. However, the present invention can of course be applied to the ADSL central office end transceiver unit (ATU-C) 15, by providing a NEXT table for the NET noise and a FEXT table for the FEXT noise respectively for the equalizers of the TEQ and the FEQ of the ADSL central office end transceiver unit (ATU-C) 15, and switching between these tables in correspondence with the noise. In this case, as it will seen from the ADSL central office end transceiver unit (ATU-C) 15, contrary to when seen from the ADSL remote terminal end transceiver unit (ATU-R) 14, the interference noise sent from the central office end transceiver unit (ISDN LT) of the ISDN transmission system, being a near half-duplex communication device, is the NEXT noise; and the interference noise sent from the ISDN terminal end transceiver unit (ISDN NT1), which becomes a distant half-duplex communications device, is the FEXT noise.

Furthermore, as mentioned above, the first embodiment describes a case when the synchronism controller 18 of the central office (CO) 11 synchronizes the transmission times of the TCM-ISDN communication and the ADSL communication. However, the present invention is not limited to this, and may acceptably be used without the synchronism controller 18, and without synchronizing the two communications.

For instance, a not illustrated switch-timing notification section can be provided to the central office (CO) 11, in order to notify the ADSL remote terminal end transceiver unit (ATU-R) 14 the timing of the FEXT noise and NEXT noise generation (i.e. the timing of the switch between upstream and downstream data of the TCM-ISDN communications via the TCM-ISDN transmission path 12 obtained from the TCM-ISDN central office end transceiver unit (TCM-ISDN LT) 17. Further, the ADSL remote terminal end transceiver unit (ATU-R) 14 can identify the timing of upstream and downstream data in TCM-ISDN communications by a method such as "Proposed ANNEX C of G. dmt, ADSL under TCM-ISDN noise environment" NEC, ITU-T SG15 Q4 D. 156(WP1/15) Geneva, Feb. 9–20, 1998, for instance. Furthermore, a not illustrated noise detection determining circuit or the like can be provided to the ADSL remote terminal end transceiver unit (ATU-R) 14, in order to detect the NEXT noise and the FEXT noise and directly identify the timing of them.

In this way, it is possible to deal with FEXT noise and NEXT noise, even if synchronization of the upstream and downstream data between the TCM-ISDN communications and ADSL communications at the central office (CO) 11 is not taken. In particular, when the ADSL remote terminal end transceiver unit (ATU-R) 14 identifies the timing of upstream and downstream data in TCM-ISDN communications by a method such as "Proposed ANNEX C of G. dmt, ADSL under TCM-ISDN noise environment" NEC, ITU-T SG15 Q4 D. 156(WP1/15) Geneva, Feb. 9–20, 1998, for instance, and a not illustrated noise detection determining circuit or the like is provided to the ADSL remote terminal end transceiver unit (ATU-R) 14, there is no necessity for newly installing a synchronism controller 18 or a not illustrated switch timing notification section in the central office (CO) 11. Therefore, existing devices such as a conventional central office can be used without adding any improvements. Then, the NEXT noise or the FEXT noise can be recognized only by improving the ADSL remote terminal end transceiver unit to switch the NEXT table and the FEXT table.

Next, a second embodiment of the digital communications device of the present invention is explained referring to the drawings as follows.

Figure 4:
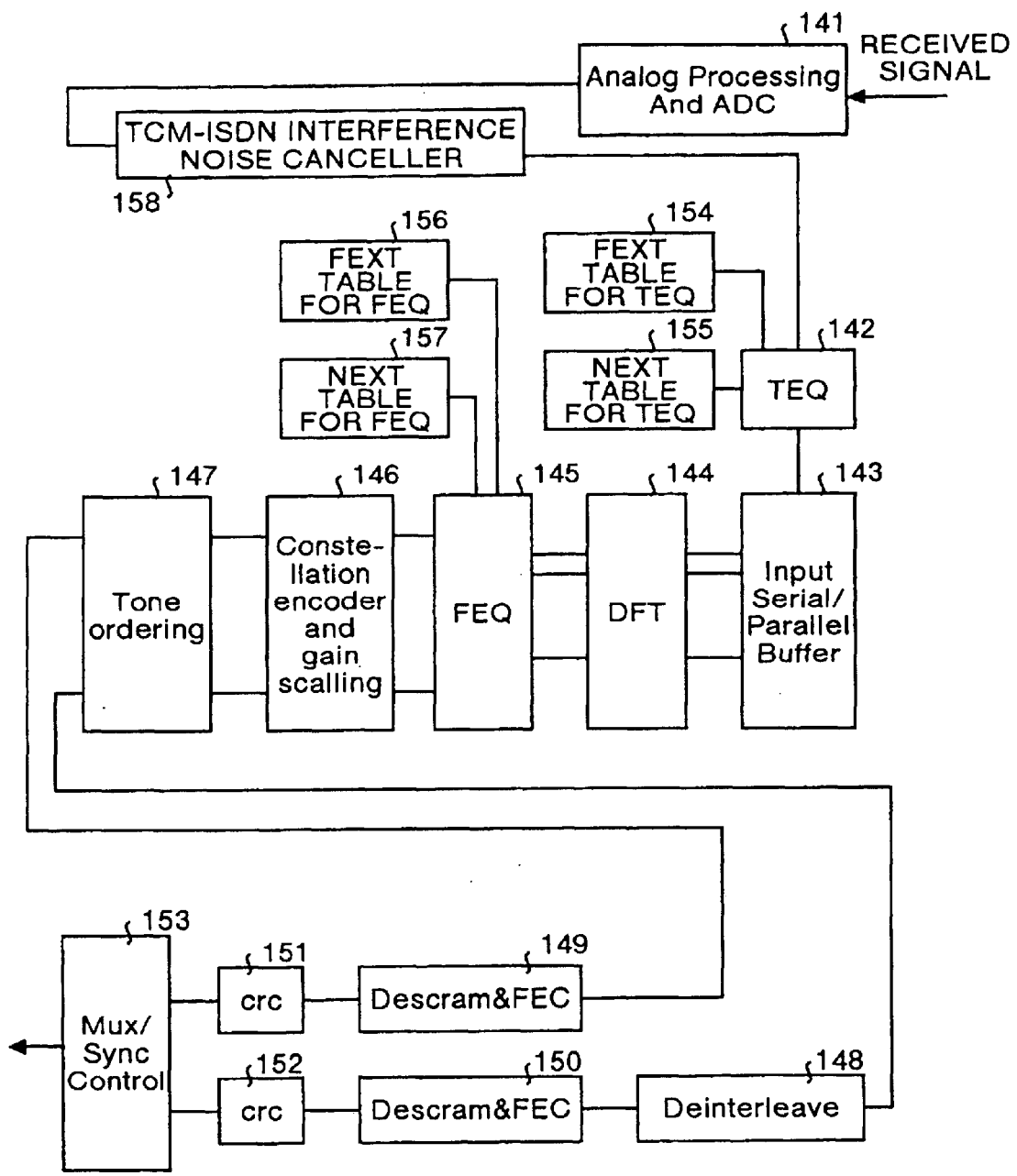
FIG. 4 shows a constitution of a receiver system of an ADSL remote terminal end transceiver unit (ATU-R) 14 according to a second embodiment of the digital communication device of the present invention.

FIG. 4 functionally shows a constitution of a reception section or a receive only machine (hereinafter, reception system) of a communication modem or the like of an ADSL remote terminal end transceiver unit (ATU-R) 14, which is a second embodiment of the digital communication device of the present invention.

In this figure, the same reference numerals are provided to the same constituent element as the reception system of the first embodiment shown in FIG. 1 and their explanation is omitted. 158 is a TCM-ISDN interference noise canceller which measures the transmission characteristics by the NEXT noise and the FEXT noise of predetermined data such as a frame word pattern and a training pattern and the like which pattern and timing is provided beforehand in the transmission frame of a TCM-ISDN communication, generates replicas of these patterns by a method explained later, and subtracts these replicas from the received signal. Therefore, the feature in the reception system of the second embodiment is to be added the TCM-ISDN interference noise canceller 158 to the reception system of the first embodiment.

Figure 5:
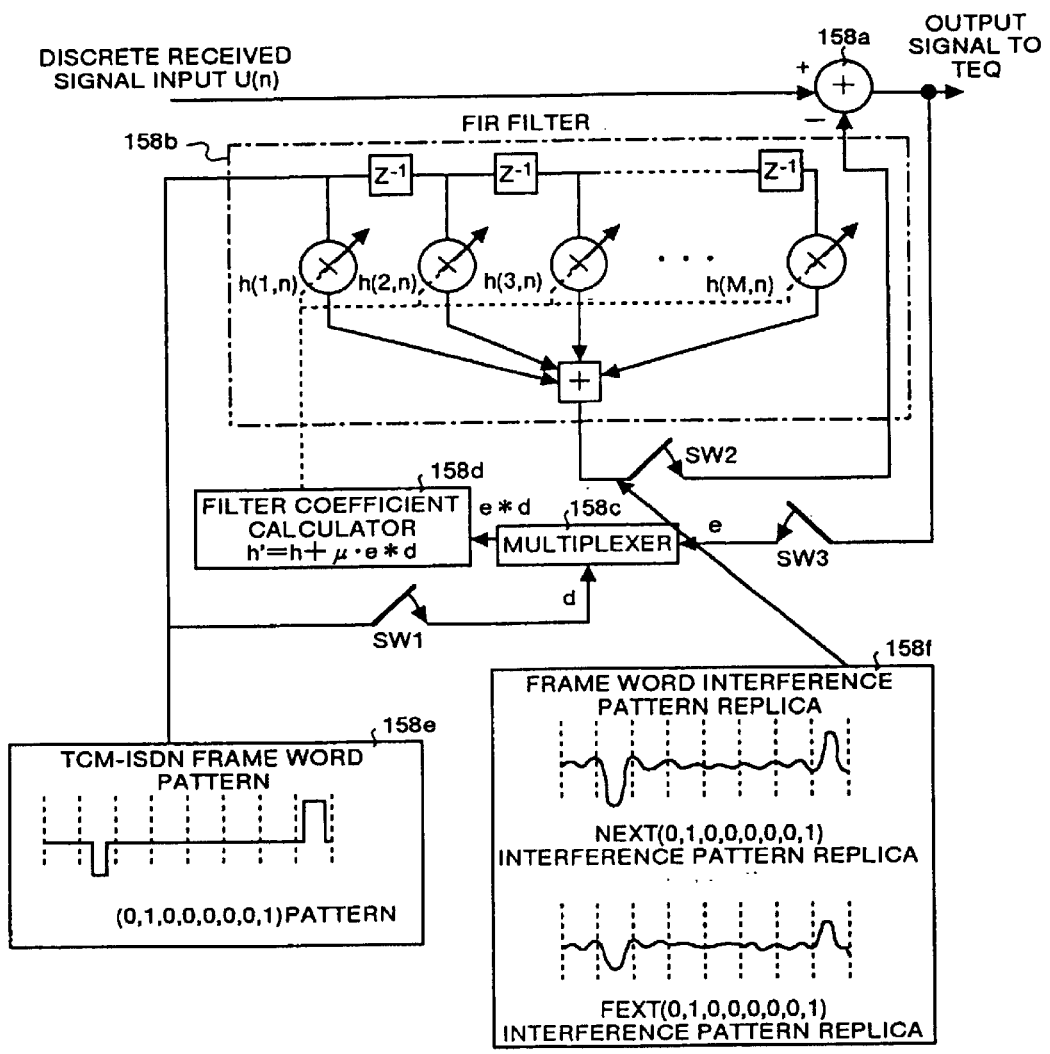
FIG. 5 shows an example of a detailed constitution of a TCM-ISDN interference noise cancel section 158 according to the second embodiment.

FIG. 5 shows an example of a detailed constitution of the TCM-ISDN interference noise canceller 158 of the second embodiment.

In the FIG. 158a is a subtractor; 158b is an FIR (finite-length impulse response) filter; 158c is a multiplexer; 158d is a filter coefficient calculator; 158e is a TCM-ISDN frame word pattern memory; and SW1 to SW3 are switches. 158f shows replicas of the TCM-ISDN frame word patterns for each of the NEXT noise and the FEXT noise.

h(k,n) (k=1~M) in the FIR filter 158b is the filter coefficient of the FIR filter 158b, and the one for the NEXT noise and the one for the FEXT noise are separately prepared.

Furthermore, in the above figure symbol e represents an error signal matrix; d represents a matrix of known TCM-ISDN frame word patterns; $\mu$ represents a step coefficient; h represents the present filter coefficient matrix; and h' represents the next filter coefficient matrix.

Next, the operation will be explained. First of all, the ADSL remote terminal end transceiver unit (ATU-R) 14 and the ADSL central office end transceiver unit (ATU-C) 15 identify the timings of upstream and downstream data in a TCM-ISDN communication. As in the first embodiment, the timings of upstream and downstream data in a TCM-ISDN communication can be identified if the synchronism controller 18 is taking the synchronization between the upstream and downstream data in the TCM-ISDN communication and the ADSL communication. When it is not taking the synchronization between both communication, the timing of the TCM-ISDN can be identified by a method such as, for instance, "Proposed ANNEX C of G. dmt, ADSL under TCM-ISDN noise environment" NEC, ITU-T SG15 Q4 D.156(WP1/15) Geneva, Feb. 9–20, 1998. By such means, the ADSL remote terminal end transceiver unit (ATU-R) 14 and the ADSL central office end transceiver unit (ATU-C) 15 can identify the timing of generation of frame words in upstream and downstream data in the TCM-ISDN communication.

Furthermore, since the pattern of this frame word is already known, to determine interference noise transmission functions of the FEXT noise and the NEXT noise resulting from this frame, during a period when no ADSL communication is being transmitted and only interference noise generated during frame word transmission in a TCM-ISDN communication is being input, the TCM-ISDN interference noise canceller 158 of the second embodiment determines a interference noise transmission function using the frame word pattern stored in advance in the following way.

That is, the TCM-ISDN interference noise canceller 158 first reads out for instance frame word pattern matrix d in the TCM-ISDN communication comprising a pattern (0, 1, 0, 0, 0, 0, 0, 1) or the like, from the TCM-ISDN frame word pattern memory 158e. In compliance with the present filter coefficient matrix h, this is filtered by the filter 158b. At this point, all the switches SW1 to SW3 are OFF state.

Next, keeping SW2 closed, the results output from the filter 158b are sent separately for the NEXT noise and the FEXT noise to the subtractor 158a. In the case of a frame word transmitted in a TCM-ISDN communication, the result output from the filter 158b is subtracted from interference noise sent as a discrete receive signal input U(n) via the ADSL transmission path 13 to the ADSL remote terminal end transceiver unit (ATU-R) 14, producing an output matrix e.

Next, SW3 and SW1 are closed, and the multiplexer 158c multiplexes the output matrix e with the matrix d of frame word patterns in TCM-ISDN communications. The multiplexed output matrix e*d is sent to the filter coefficient calculator 158d, which determines a filter coefficient matrix h' by the following equation.

$$h' = h + \mu \cdot e^* d$$

By this operation, each filter coefficient matrix h of the FIR filter 158b is updated to the next filter coefficient matrix h', converging them to be close to the respective interference noise transmission functions of the NEXT noise and the FEXT noise. By repeating such processing prior to commencing ADSL communications and updating the filter coefficient matrixes h of the FIR filter 158b sequentially, the filter coefficient matrixes h are converged to the values showing interference noise transmission functions of the NEXT noise and the FEXT noise, prior to commencing ADSL communications.

Then, when ADSL communication has commenced, the switches SW3 and SW1 are opened only at the timing of the frame word pattern in the TCM-ISDN communication, and only SW2 are closed. Then, a TCM-ISDN frame word interference pattern replica 158fIC is created using the filter coefficient matrix h which was converged prior to commencing ADSL communications. This is then subtracted from the ADSL receive signal input as the discrete receive signal input U(n).

With such processing, the influence of the interference noise of FEXT noise and NEXT noise generated by the transmission of the frame word pattern can be removed, only it is while the frame word pattern is transmitted in the TCM-ISDN communication.

Such processing is carried out for each of the FEXT noise and the NEXT noise, and two frame word interference pattern replicas are created. Then, are subtracted from the ADSL received signals in correspondence with their respective timing, and the influence of the interference noise during the transmission of a frame word during a TCM-ISDN communication is removed.

Therefore, according to the second embodiment, the same effects equal with the first embodiment are achieved excluding time that a frame word pattern is transmitted in a TCM-ISDN communication. On the other hand, during time that the transmission of the frame word pattern is transmitted in the TCM-ISDN communication, frame word interference noise in correspondence with the FEXT noise and the NEXT noise is cancelled, and the influence thereof is removed.

As a result, because the frame word interference noise is being cancelled while the frame word pattern is transmitted in the TCM-ISDN communication, the S/N ratio can be improved; the probability of error generation can be lowered; the communications distance can be lengthened at each ADSL transmission rate; and the transmission rate in the service domain can be increased, etc. as compared to the first embodiment.

In the second embodiment, a case was described wherein the frame word interference noise is cancelled while a frame word pattern is being transmitted in a TCM-ISDN communication. However, the present invention is not limited to this. When a signal and data whose timing and pattern is known in advance, it is acceptable to use a training pattern or the like in a TCM-ISDN communication.

Next, a third embodiment of the digital communications device of the present invention will be explained referring to the drawings.

Figure 6:
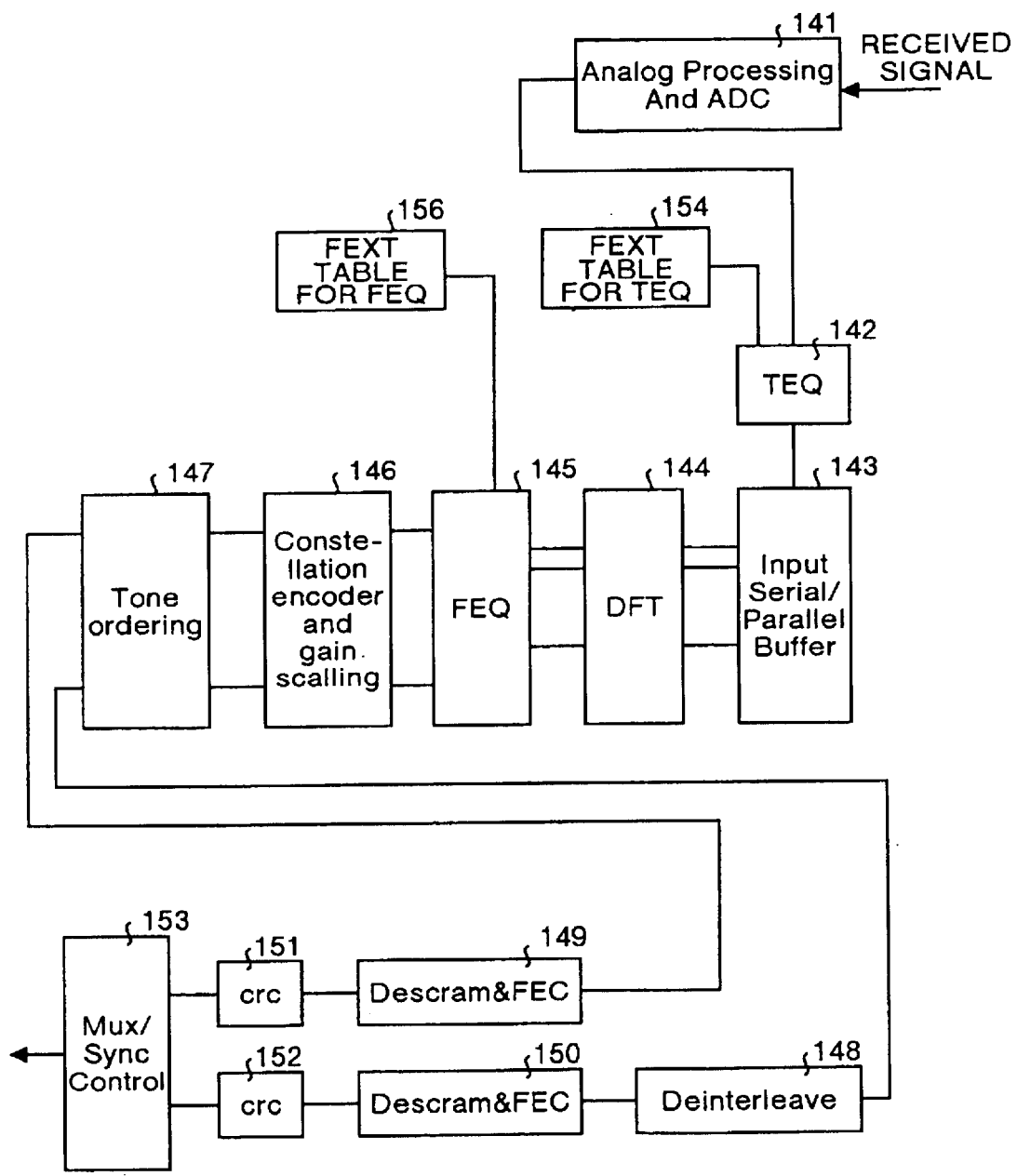
FIG. 6 shows a constitution of a receiver system of an ADSL remote terminal end transceiver unit (ATU-R) 14 according to a third embodiment of the digital communications device of the present invention.

FIG. 6 functionally shows a constitution of a reception system of the ADSL remote terminal end transceiver unit (ATU-R) 14, forming a third embodiment of the digital communication device of the present invention.

As shown in this figure the feature in the reception system of the ADSL remote terminal end transceiver unit (ATU-R) 14 of the third embodiment is to be omitted removing the NEXT table for TEQ 155 and the NEXT table for FEQ 157 from the constitution of the reception system of the ADSL remote terminal end transceiver unit (ATU-R) 14 according to the embodiment shown in FIG. 2, and to be supplied equalizing coefficients to the TEQ 142 and the FEQ 145 only by the FEXT table for TEQ 154 and the FEXT table for FEQ 156.

Here, the FEXT tables 154 and 156 store equalizing coefficients which optimally correct the transmission characteristics that contain the FEXT noise, by carrying out training by equalizing the time domain equalizer (TEQ) 142 and the frequency domain equalizer (FEQ) 145 only during a FEXT period in which the FEXT noise is being transmitted, synchronizing with downstream data in a TCM-ISDN communication at the ADSL remote terminal end transceiver unit (ATU-R) 14 side during the training period and the like prior to commencing ADSL communications.

Next, the operation of characteristic parts of the third embodiment will be explained.

In the reception system of the third embodiment, during the FEXT period when data are being transmitted downstream along the TCM-ISDN transmission path 12, the time domain equalizer (TEQ) 142 and the frequency domain equalizer (FEQ) 145 deem this to be generation of FEXT noise, and optimally correct the transmission path characteristics containing the FEXT noise in the time domain and the frequency domain, by using the equalizing coefficients in the FEXT table for TEQ 154 and the FEXT table for FEQ 156 respectively.

On the other hand, during the period when data are being transmitted upstream on the TCM-ISDN transmission path 12 and NEXT noise is being generated, the equalizers 142 and 145 optimally correct the transmission path characteristics in the time domain and the frequency domain, using the equalizing coefficients in the FEXT table for TEQ 154 and the FEXT table for FEQ 156 respectively.

Figure 7:
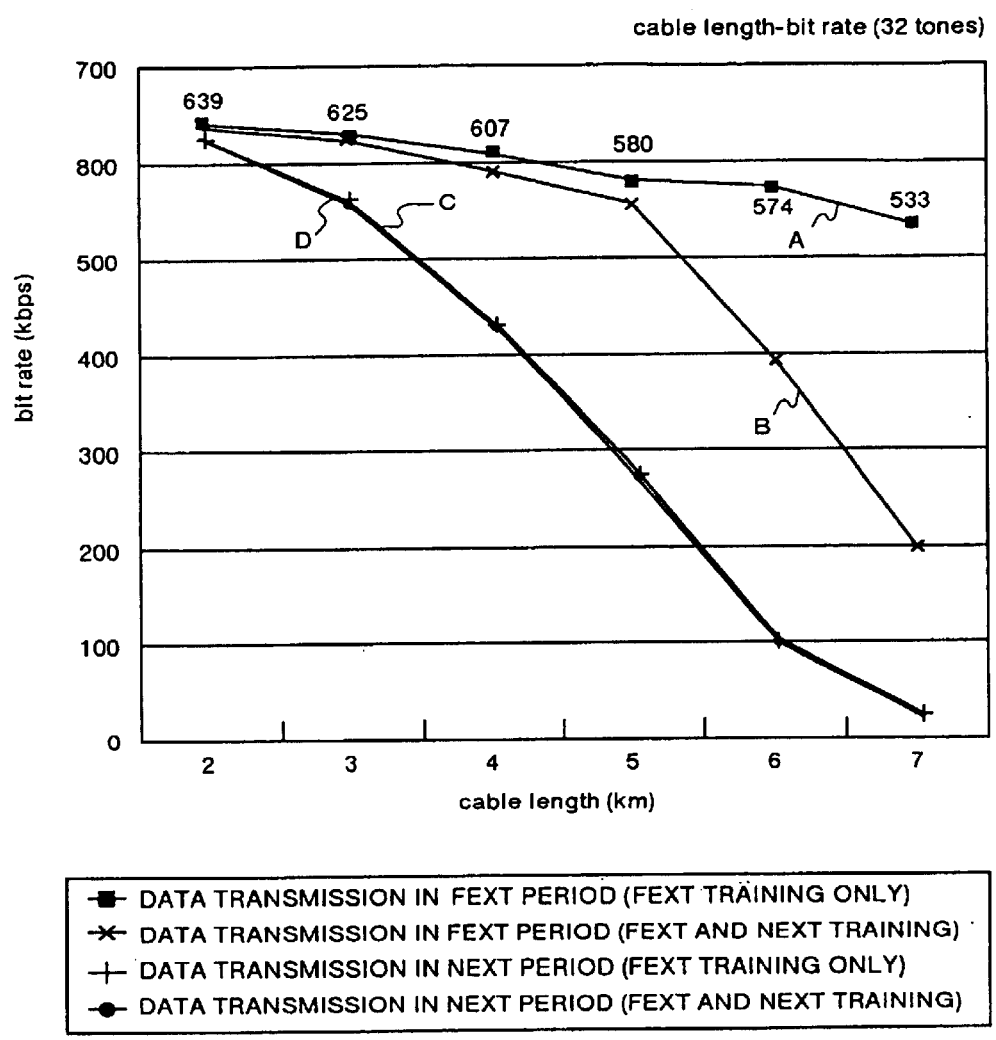
FIG. 7 shows the transmission bit rate with respect to cable length according to the third embodiment.

FIG. 7 shows the state of a transmission bit rate with respect to cable length according to the third embodiment.

In FIG. 7, graph line A represents a bit rate of data transmitted during the FEXT period of the third embodiment when training is only carried out in the FEXT period. Graph line B represents a bit rate of data transmitted during the FEXT period when training has been carried out through the FEXT period and the NEXT period without switching TEQ and FEQ coefficient tables, as in the conventional art. Graph line C represents a bit rate of data transmitted during the NEXT period of the third embodiment when training is only carried out in the FEXT period. Graph line D represents a bit rate of data transmitted during the NEXT period when training has been carried out through the FEXT period and the NEXT period without switching TEQ and FEQ coefficient tables, as in the conventional art.

As can be understood from this figure in the data transmission in the FEXT period, performing training only in the FEXT period as shown by the graph line A, the transmission bit rate has far better characteristics even if the cable becomes long, compared with the case to carry out training through the FEXT period and the NEXT period without switching TEQ and FEQ coefficient tables, as in the conventional art shown by the graph line B.

The reason for this is that, because of difference of coefficients of the training period by the high-power NEXT noise in the NEXT period, the characteristics of the bit rate have been finally depraved.

On the other hand, since the noise in the FEXT period is with a low power, there is less difference in the training period. Then, the coefficients converge stabilizing to the transmission characteristics for showing the excellent characteristics. Therefore, it can be understood that, eventually, for data transmission in the FEXT period, it is better to carry out training only in the FEXT period. The third embodiment uses equalizing coefficients obtained by training only in the FEXT period.

In the NEXT period, as shown by the graph lines C and D, the bit rate of the data transmission is not very different, for the third embodiment, where training is only performed in the FEXT period as shown by graph line C, and for the case, where training has been carried out through the FEXT period and the NEXT period without switching between TEQ and FEQ coefficient tables, as in the conventional art.

Figure 8:
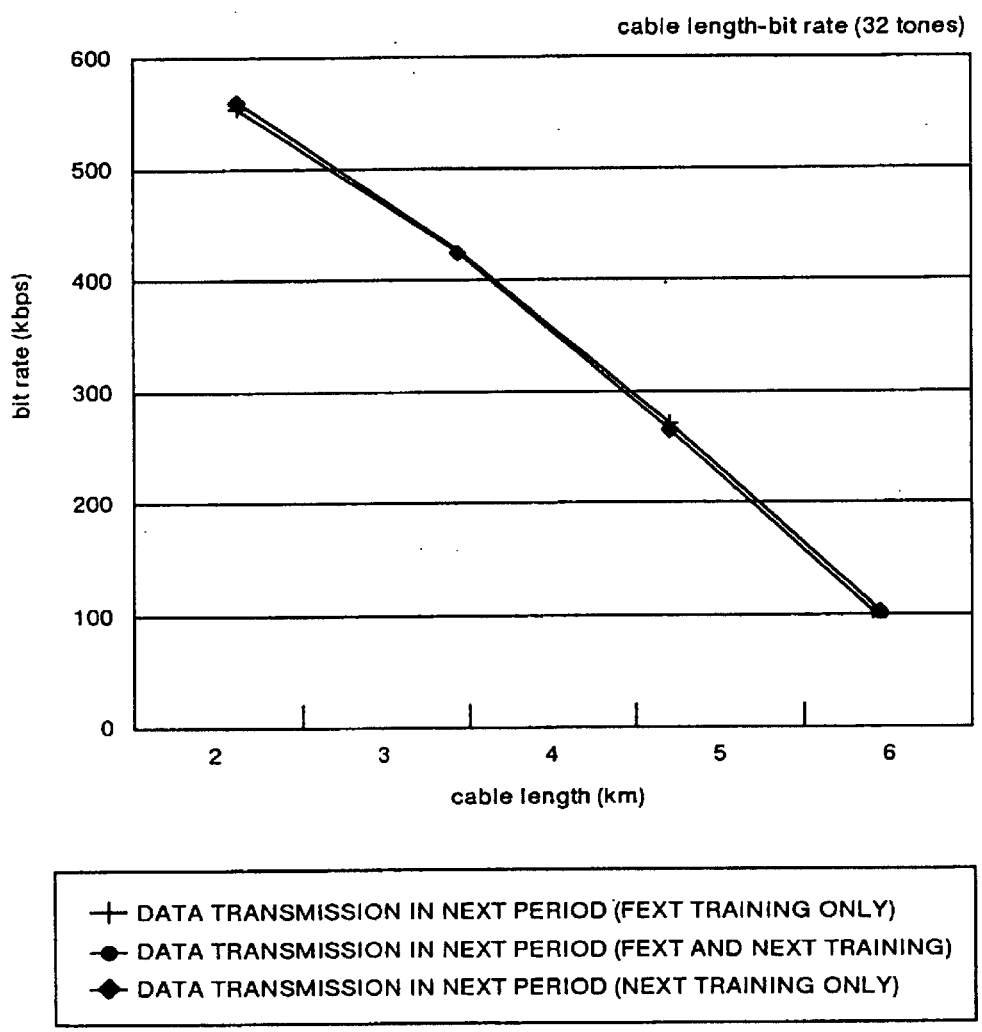
FIG. 8 shows the fact that only a small difference occurs when coefficients collected in the FEXT period are applied in the NEXT period.

FIG. 8 shows that there is only a little difference, even if the coefficient converged in a FEXT period is applied for NEXT period.

As shown in FIG. 8, it is understood that there is almost no change in the attenuation of the bit rate of data transmitted in the NEXT domain with respect to cable length, even when training is carried out only in the FEXT period, when training is carried out while switching between the FEXT period and the NEXT period, and even when training is carried out only in the NEXT period.

For such reason, in the third embodiment, coefficients converged by FEXT noise training is applied in the FEXT period and the NEXT period respectively.

Therefore, according to the digital communication device of the third embodiment, FEXT tables 154 and 156 are provided to the time domain equalizer (TEQ) 142 and the frequency domain equalizer (FEQ) 145 respectively, using equalizing coefficient obtained by training only of the FEXT noise. Consequently, in the training periods of the TEQ 142 and the FEQ 145, an optimum coefficient for equalizing the FEXT noise can be determined in a shorter time than conventional methods. In addition, deterioration in the transmission rate caused by the FEXT noise can be particularly effectively reduced during ADSL communication. As a result, the S/N ratio can be improved; the error generation probability falls; or the communication distance in each transmission rate of ADSL transmission can be extended. In addition, the transmission rate in the service domain can be improved.

Furthermore, according to the third embodiment, even if a coefficient trained in a FEXT period is used for the data transmission in a NEXT period, there are few differences that the coefficient trained in a NEXT period is used. Therefore, the coefficient training can be minimized, and the short training be executed.

Furthermore, in the third embodiment, the synchronism controller 18 of the central office (CO) 11 synchronizes the transmission times of the TCM-ISDN central office end transceiver unit (TCM-ISDN LT) 17 and the ADSL central office end transceiver unit (ATU-C) 15. Consequently, even if the ADSL remote terminal end transceiver unit (ATU-R) 14 does not identify the timing of the NEXT noise and the FEXT noise generation, it is able to activate the FEXT tables 154 and 156.

As mentioned above, the third embodiment describes a case where the present invention is applied to the ADSL remote terminal end transceiver unit (ATU-R) 14. However, the present invention can of course be applied to the ADSL central office end transceiver unit (ATU-C) 15, by providing a FEXT table for training in the FEXT period to equalize the TEQ and FEQ equalizers of the ADSL central office end transceiver unit (ATU-C) 15, and using the FEXT table in both NEXT and FEXT periods at the time of data transmission. In this case, the data flow is seen from the ADSL central office end transceiver unit (ATU-C) 15, contrary to seeing from the ADSL remote terminal end transceiver unit (ATU-R) 14, the interference noise, which the central office end transceiver unit (ISDN LT) of the ISDN transmission system as a near half-duplex communications device transmits, is the NEXT noise; and the interference noise, which the ISDN terminal end transceiver unit (ISDN NT1) as a distant half-duplex communications device transmits, is the FEXT noise.

Furthermore, as mentioned above, the third embodiment describes a case when the synchronism controller 18 of the central office (CO) 11 synchronizes the transmission times of the TCM-ISDN communication and the ADSL communication. However, the present invention is not limited to this, and may acceptably be used without the synchronism controller 18, and without synchronizing the two communications.

In the embodiments previously described, the digital communication device receives data by TCM-ISDN communication in a NEXT noise domain and a FEXT noise domain. However, a fourth embodiment is characterized in that data is received only for the FEXT period when the amount of the noise which the digital communication device side receives is a little.

More specifically, the digital communication device of the fourth embodiment is characterized in that it performs Ping-Pong half-duplex data communication. That is, in the FEXT period, during which data are sent downstream on the TCM-ISDN transmission path 12 and the FEXT noise occurs, the digital communication device only receives data affected by noise. During the NEXT period, in which data are sent upstream on the TCM-ISDN transmission path 12 and the NEXT noise occurs, the digital communication device only receives data which is unaffected by noise.

That is, the reception system of the digital communication device according to the fourth embodiment, data is only received in synchronism with the FEXT period of a TCM-ISDN communication, and the training to equalize the TEQ 142 and the FEQ 145 is carried out only in the FEXT period, as in the third embodiment. Similarly, only the FEXT tables 154 and 156 obtained by training during the FEXT period are used as the coefficient tables used while receiving data.

Figure 9:
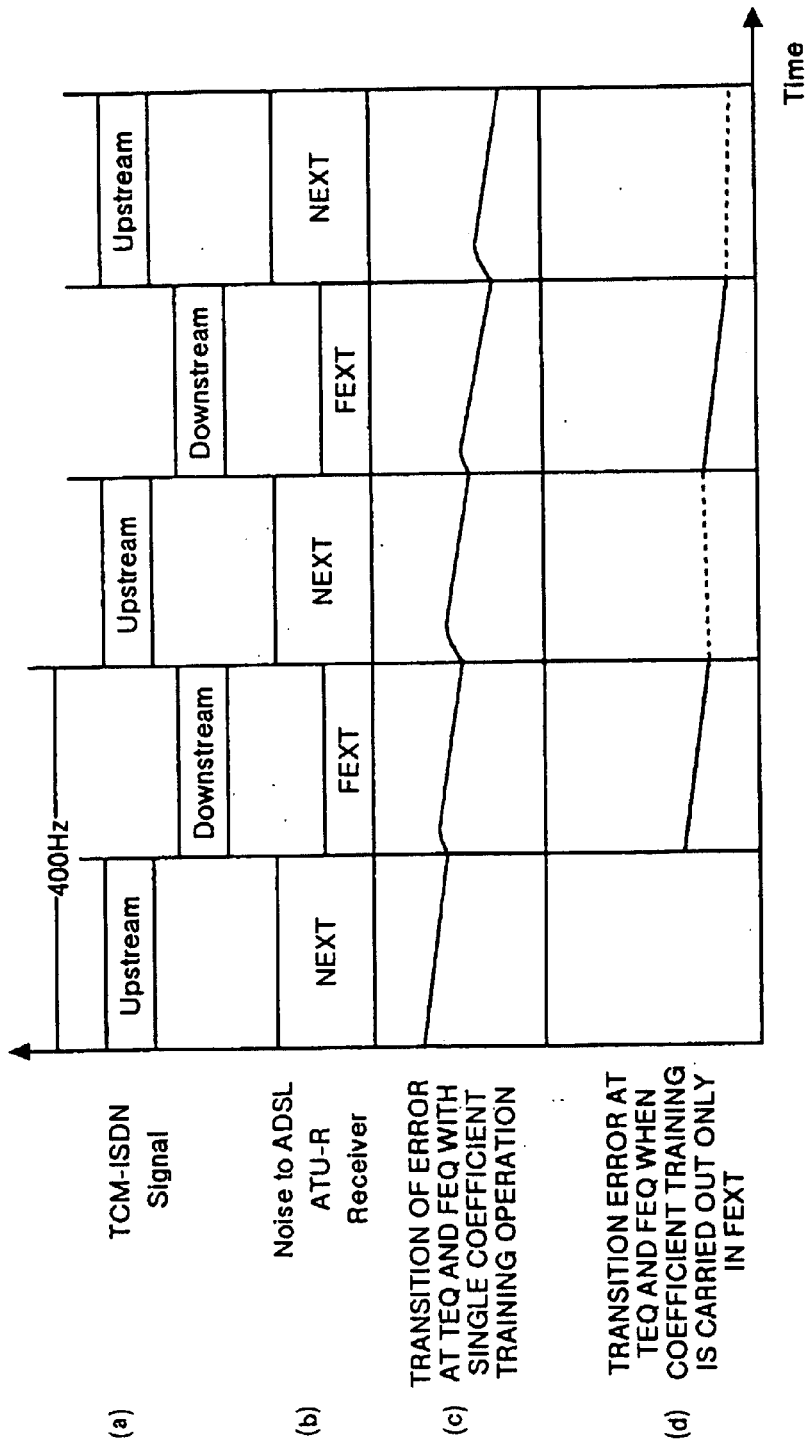
FIG. 9 shows the change and the like of amount of error when TEQ and FEQ carry out coefficient training only in the FEXT noise area according to a fourth embodiment.
Figure 10:
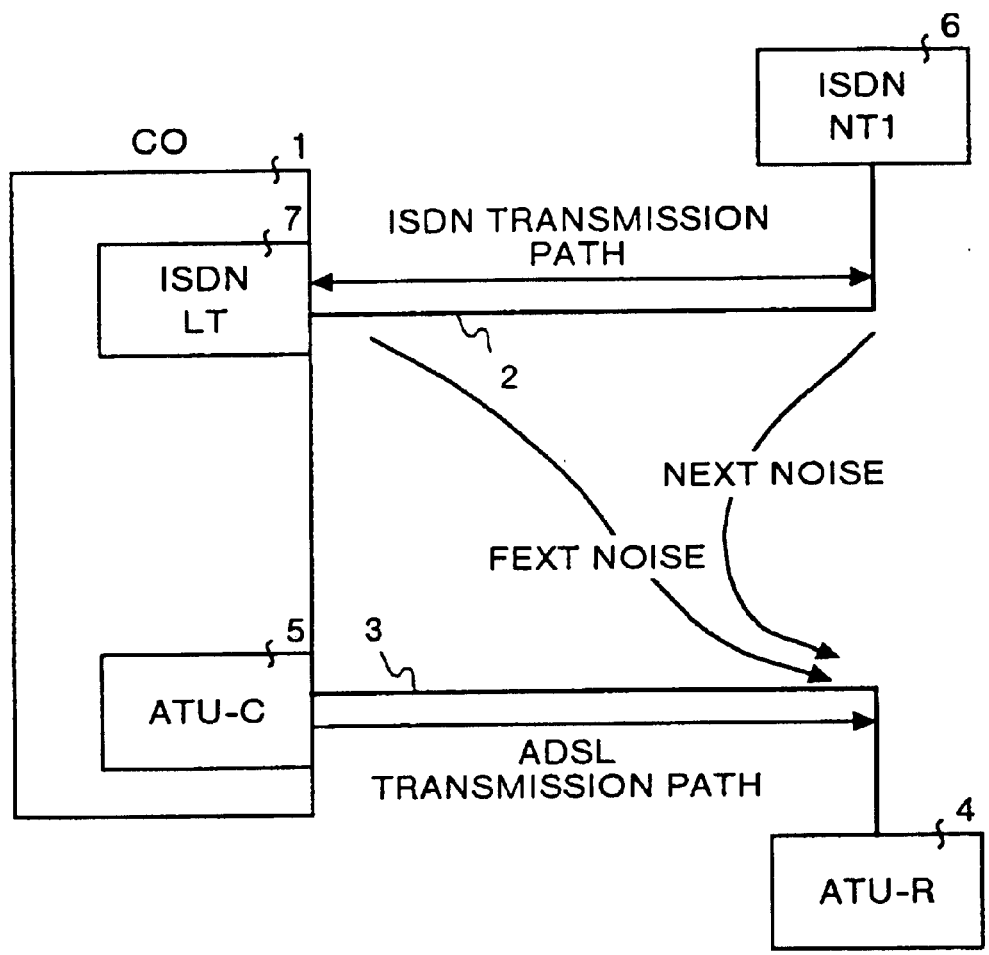

FIG. 9(d) shows the change of error when coefficient training is carried out using the FEXT tables 154 and 156 only in the FEXT period, in the time domain equalizer (TEQ) 142 and the frequency domain equalizer (FEQ) 145 of the fourth embodiment.

Since FIGS. 9(a) to (c) are the same as FIGS. 3(a) to (c), explanation thereof will be omitted. Furthermore, in the third embodiment, coefficient training with the FEXT tables 154 and 156 is carried out only in the FEXT period, a transition of the amount of the error becomes same as FIG. 9(d).

As shown in FIG. 9(d), the fourth embodiment uses the FEXT tables 154 and 156, obtained by coefficient training of the equalizers TEQ 142 and FEQ 145 only during the FEXT period when data is received, to ensure that the amounts of error of the equalizers TEQ 142 and FEQ 145 converge in the FEXT periods only. Therefore, unlike the amount of error in the conventional case shown in FIG. 9(c), in which training is carried out using a single coefficient table for both periods of the FEXT noise and the NEXT noise, once the amount of error has dropped during the FEXT period, it continues to drop gradually during subsequent periods without momentarily rising.

In other words, in the fourth embodiment, the equalizers TEQ 142 and FEQ 145 are coefficient-trained only during the FEXT periods. In addition, the FEXT tables 154 and 156, obtained by this coefficient training, are used to provide most appropriate equalizing coefficients to make the amounts of error of the equalizers TEQ 142 and FEQ 145 converge in the FEXT periods only.

Therefore, according to the digital communication device of the fourth embodiment, FEXT tables 154 and 156 are provided for the time domain equalizer (TEQ) 142 and the frequency domain equalizer (FEQ) 145 respectively, using equalizing coefficients obtained by training only of the FEXT noise, as in the third embodiment. Consequently, in the training periods of the TEQ 142 and the FEQ 145, an optimum coefficient for equalizing the FEXT noise can be determined in a shorter time than by conventional methods. In addition, deterioration in the transmission rate caused by the FEXT noise can be particularly effectively reduced during ADSL communication.

In particular, in the fourth embodiment, only the FEXT tables 154 and 156, using equalizing coefficients obtained by training in FEXT periods, are provided to the TEQ 142 and the FEQ 145, as in the third embodiment. However, in the fourth embodiment, since no data is received in the NEXT periods, the effects of noise do not need to be considered. Therefore, the characteristics of the transmission path can be adequately corrected using only coefficients obtained by training in the FEXT periods. As a result, the coefficient training can be minimized, and the short training be executed.

The explanation of the fourth embodiment described Ping-Pong transmission by half-duplex communication, in which data is received only in the FEXT periods and transmitted only in the NEXT periods. However, in the present invention, it is sufficient to receive data only in the FEXT periods, and if data is transmitted not only in the NEXT periods but also in the FEXT periods, the effect same as the above-mentioned is achieved, since there is no need to consider the effects of noise when transmitting data.

The above embodiments 1 to 4 describe a case where the half-duplex communication devices applying interference noise are TCM-ISDN communication devices, namely the TCM-ISDN remote terminal end transceiver unit (TCM-ISDN NT1) 16 and the TCM-ISDN central office end transceiver unit (TCM-ISDN LT) 17, and the digital communication devices on the side to which the noise is applied are ADSL communication devices, namely the ADSL remote terminal end transceiver unit (ATU-R) 14 and the ADSL central office end transceiver unit (ATU-C) 15, which perform ADSL communication, this being a type of XDSL communication system. However, the present invention is not restricted to this, and as long as the half-duplex communication device on the side applying noise is a device for performing so-called Ping-Pong system half-duplex communication, devices other than a TCM-ISDN communication device are acceptable. Furthermore, the digital communication device on the side to which noise is applied, can be a xDSL communication device performing HDSL communication or SDSL communication other than ADSL communications or another digital communication device regardless of the full duplex communication method or the half duplex communication method.

In particular, the digital communication device of the present invention described above in the embodiments 1 to 4 can be applied to a variety of digital communication devices such as a digital television for receiving digital broadcast via a digital transmission path such as an xDSL transmission path, a computer for receiving and downloading free or paid-for data, video images, audio sound, and the like through a network, a digital television, an AV unit, household electrical appliances, and household electrical appliances using a digital communication device as a communication modem or the like. For instance, it can be applied in household appliance such as a cooking device, such as a microwave oven which contains a digital communication device and performs digital communication via a network, downloading multimedia data such as visual and audio data showing cooking recipes and such like, displaying them on a display screen, and providing an audio guide through a speaker.

As described above, the present invention separately provides a NEXT noise coefficient table, in which are stored equalizing coefficients of equalizers to optimally correct characteristics of a transmission path containing the NEXT noise transmitted from a near-end half-duplex communication device, being one of multiple half-duplex communication devices, which is near to the main device; and a FEXT noise coefficient table, in which are stored equalizing coefficients of equalizers to optimally correct characteristics of a transmission path containing the FEXT noise transmitted from a far-end half-duplex communication device, being one of multiple half-duplex communication devices, which is far from the main device. When the NEXT noise is transmitted from the near-end half-duplex communication device, the equalizers correct the characteristics of the transmission path based on the NEXT noise coefficient table. On the other hand, when the FEXT noise is transmitted from the far-end half-duplex communication device, the equalizers correct the characteristics of the transmission path based on the FEXT noise coefficient table. As a consequence, during the training period of the equalizers, the most appropriate equalizing coefficients for the FEXT noise and the NEXT noise can be determined in a shorter time than conventional systems. In addition, the FEXT noise and the NEXT noise can be effectively eliminated during communications.

As a result, according to the present invention, even if noise is received from adjacent half-duplex transmission paths, the S/N ratio can be improved; the probability of errors arising can be lowered; and the communication distance can be lengthened at each ADSL transmission rate. In addition, the transmission rate in the service domain can be increased.

In the next aspect of the invention, moreover, communications between half-duplex communication devices are synchronized, and when NEXT noise has been transmitted from the near-end half-duplex communication device while data is travelling upstream or downstream on a half-duplex transmission path from the terminal end to the central office end, the transmission path characteristics are corrected based on equalizing coefficients in the NEXT noise coefficient table applied to the equalizers. On the other hand, when the FEXT noise has been transmitted from the far-end half-duplex communication device while data is travelling downstream or upstream on a half-duplex transmission path from the central office end to the terminal end, the transmission path characteristics are corrected based on equalizing coefficients in the FEXT noise coefficient table applied to the equalizers. Therefore, by switching between the coefficient tables in accordance with generation of the NEXT noise and the FEXT noise, the influences of the noise can be eliminated without the timings of the NEXT noise and the FEXT noise being identified by the digital communication device.

In the next aspect of the invention, a digital communication device, which is influenced by interference noise due to being adjacent or the like to the half-duplex transmission path, detects interference noise sent from the half-duplex communications device and determines whether it is the NEXT noise or the FEXT noise. Therefore, only by improving the digital communication device concerned without adding any improvements to an existing device it is possible to switch between the NEXT table and the FEXT table only by improving a digital device.

In the next aspect of the invention, prior to communication, filter coefficients to converge the transmission functions of noise are determined using predetermined data in frames transmitted between plurality of half-duplex communication devices, the data having a pre-identified pattern and generation timing. At transmission, during the generation timing of the predetermined data, a replica of the predetermined data affected by the noise is created using the converged filter coefficient, and the replica is subtracted from the received signal. Consequently, while the predetermined data is being transmitted in a transmission frame between the half-duplex communication devices, the interference noise of the predetermined data corresponding to the FEXT noise and the NEXT noise each can be cancelled, and can reduce the influence of the noise. Accordingly, the S/N ratio can be improved; the error generation probability falls; or the communication distance in each transmission rate can be extended. In addition, the transmission rate in the service domain can be increased.

The next aspect of the invention provides a FEXT noise table which stores equalizing coefficient for optimally correcting transmission path characteristics comprising FEXT noise transmitted from the far-end half-duplex communication device that is on side far from the main device among plurality of half-duplex communication devices. When NEXT noise is transmitted from the near-end half-duplex communication device, or when FEXT noise is transmitted from the far-end half-duplex communication device, in each case the equalizers optimally correct the characteristics of the transmission path based on equalizing coefficients in the FEXT noise coefficient tables. Therefore, in the training timing period of the equalizers, an optimal equalizing coefficient for when FEXT noise is generated can be determined in a shorter time than the conventional systems. On the other hand, when transmitting, deterioration in transmission characteristics can be effectively reduced even when both FEXT noise and NEXT noise has been generated.

As a result, according to the present invention, even if noise is received from adjacent half-duplex transmission paths, the S/N ratio can be improved; the probability of errors arising can be lowered; and the communications distance in each ADSL transmission rate can be extended. In addition, the transmission rate in the service domain can be increased.

In the next aspect of the invention, moreover, communications between half-duplex communication devices are synchronized, and when NEXT noise has been transmitted from the far-end half-duplex communication device while data is travelling upstream or downstream on a half-duplex transmission path from the central office end to the terminal end, the transmission path characteristics are corrected based on equalizing coefficients in the FEXT noise coefficient table applied to the equalizers. Therefore, the digital communication device can identify the generation timing of the FEXT noise, perform training in correspondence therewith, and effectively reduce deterioration in characteristics caused by the noise by using the FEXT coefficient table during data communication.

In the next aspect of the invention, moreover, when a digital communications device is affected by interference noise due to being adjacent or the like to a half-duplex transmission path, the digital communication device detects interference noise sent from the half-duplex communications device and determines whether it is NEXT noise or FEXT noise. Therefore, it is possible to activate the FEXT table only by improving the digital communication device without adding any improvements to an, existing devices such as the central office.

INDUSTRIAL APPLICABILITY

As explained above, the digital communications device according to the present invention is suitable for an xDSL modem, an XDSL communication device, and the like.

What is claimed is:

1. A digital communication device for correcting transmission path characteristics containing noise transmitted from a plurality of half-duplex communication devices via a half-duplex transmission path, said device comprising:
 a near-end cross talk (NEXT) noise coefficient table, in which are stored equalizing coefficients of equalizers for correcting characteristics of a transmission path containing a NEXT noise transmitted from a near-end half-duplex communication device that is on side near to the digital communication device among said plurality of half-duplex communication devices;
 a far-end cross talk (FEXT) noise coefficient table, in which are stored equalizing coefficients of equalizers to correct characteristics of a transmission path containing a FEXT noise transmitted from a far-end half-duplex communication device that is on side far from the digital communication device among said plurality of half-duplex communication devices; and
 equalizers for correcting transmission path characteristics based on the equalizing coefficients in the NEXT noise coefficient table when the NEXT [FEXT] noise has been transmitted from said near-end half-duplex communication device, and on the other hand, for correcting transmission path characteristics based on the equalizing coefficients in the FEXT noise coefficient table when the FEXT noise has been transmitted from said far-end half-duplex communication device.

2. The digital communication device according to claim 1, wherein said digital communication device is a terminal end device for transmitting after synchronizing communication between said half-duplex communication devices, and when the NEXT noise has been transmitted from said near-end half-duplex communication device on a terminal end while data is travelling upstream on said half-duplex transmission path from a terminal end to a central office end, the transmission path characteristics are corrected based on equalizing coefficients in said NEXT noise coefficient table applied to said equalizers, and, on the other hand, when the FEXT noise has been transmitted from said far-end half-duplex communication device on the central office end while data is travelling downstream on the half-duplex transmission path from the central office end to the terminal end, the transmission path characteristics are corrected based on equalizing coefficients in said FEXT noise coefficient table applied to said equalizers.

3. The digital communication device according to claim 1, wherein said digital communication device is a central office end device for transmitting after synchronizing communication between said half-duplex communication devices, and when the NEXT noise has been transmitted from said near-end half-duplex communication device on the central office end while data is travelling downstream on said half-duplex transmission path from a central office end to a terminal end, the transmission path characteristics are corrected based on equalizing coefficients in said NEXT noise coefficient table applied to said equalizers, and, on the other hand, when the FEXT noise has been transmitted from said far-end half-duplex communication device on the terminal end while data is travelling upstream on said half-duplex transmission path from the terminal end to the central office end, the transmission path characteristics are corrected based on equalizing coefficients in said FEXT noise coefficient table applied to said equalizers.

4. The digital communication device according to claim 1 further comprising,
 a detecting and determining section for detecting the noise transmitted from said half-duplex communication device, and determining whether it is the NEXT noise or the FEXT noise; wherein, based on a determination output from said detecting and determining section, in the case of the NEXT noise, the equalizers correct the transmission path characteristics based on equalizing coefficient from said NEXT noise coefficient table, and in the case of the FEXT noise, said equalizers correct the transmission path characteristics based on equalizing coefficient from said FEXT noise coefficient table.

5. The digital communication device according to claim 1, wherein prior to communication, it determines filter coefficients to converge the transmission functions of the noise, using predetermined data in frames transmitted between said plurality of half-duplex communication devices, the data having a pre-identified pattern and generation timing, and at transmission, it creates a replica of the predetermined data affected by the noise using the converged filter coefficient during the generation timing of the predetermined data, and subtracts the replica from the received signal.

6. The digital communication device according to claim 1, wherein said half-duplex transmission path is a TCM-ISDN transmission path, said plurality of half-duplex communication devices transmit TCM-ISDN communication via said TCM-ISDN transmission path, and said main device transmits ADSL communication via an ADSL transmission path.

7. A digital communication device for correcting, when receiving data, characteristics of a transmission path containing noise transmitted from a plurality of half-duplex communication devices transmitting via half-duplex transmission paths; said device comprising:

a far-end cross talk (FEXT) noise coefficient table, in which are stored equalizing coefficients of equalizers to correct characteristics of a transmission path containing a FEXT noise, and not containing a near-end cross talk (NEXT) noise, transmitted from a far-end half-duplex communication device that is on side far from the digital communication device among said plurality of half-duplex communication devices; and equalizers for correcting transmission path characteristics based on equalizing coefficient in said FEXT noise coefficient table when a NEXT noise has been transmitted from a near-end half-duplex communication device, being one of said plurality of half-duplex communication devices, which is near to the digital communication device, and when the FEXT noise has been transmitted from said far-end half-duplex communication device.

8. The digital communication device according to claim 7, wherein said digital communication device is a terminal end device for transmitting after synchronizing communications between said half-duplex communication devices, and when the NEXT noise has been transmitted from said near-end half-duplex communication device on a terminal end while data is traveling upstream on said half-duplex transmission path from a terminal end to a central office end, the terminal end device corrects transmission path characteristics based on equalizing coefficients in said FEXT noise coefficient table applied to said equalizers, and, on the other hand, when the FEXT noise has been transmitted from said far-end half-duplex communication device on the central office end while data is traveling downstream on the half-duplex transmission path from the central office end to the terminal end, said device corrects the transmission path characteristics based on equalizing coefficients in said FEXT noise coefficient table applied to said equalizer.

9. The digital communication device according to claim 7, wherein said digital communication device is a central office end device for transmitting after synchronizing communications between said half-duplex communication devices, and when the NEXT noise has been transmitted from said near-end half-duplex communication device on the central office end while data is travelling downstream on said half-duplex transmission path from a central office end to a terminal end, said device corrects transmission path characteristics based on equalizing coefficients in said FEXT noise coefficient table applied to said equalizers, and, on the other hand, when the FEXT noise has been transmitted from a far-end half-duplex communication device on the terminal end while data is travelling upstream on said half-duplex transmission path from the terminal end to the central office end, the device corrects transmission path characteristics containing the FEXT noise based on equalizing coefficients in said FEXT noise coefficient table applied to said equalizers.

10. The digital communication device according to claim 7 further comprising a detecting and determining section for detecting the noise transmitted from said half-duplex communication device, and determining whether it is the NEXT noise or the FEXT noise; wherein, based on a determination output from said detecting and determining section, said equalizers optimally correct the transmission path characteristics based on equalizing coefficient from said FEXT noise coefficient table in the case of said NEXT noise and also in the case of FEXT noise.

11. A digital communication device for correcting, when receiving data, characteristics of a transmission path containing noise transmitted from a plurality of half-duplex communication devices transmitting via half-duplex transmission paths; said device comprising:

a far-end cross talk (FEXT) noise coefficient table in which are stored equalizing coefficients of equalizers to correct characteristics of a transmission path containing FEXT noise transmitted from a far-end half-duplex communication device that is on side far from the digital communication device among said plurality of half-duplex communication devices; and equalizers for correcting transmission path characteristics containing said FEXT noise based on equalizing coefficient in said FEXT noise coefficient table;

wherein the device receiving data only while said FEXT noise is being transmitted.

12. The digital communication device according to claim 11, wherein said digital communication device is a terminal end device for transmitting after synchronizing communications between said half-duplex communication devices, and during a period when the NEXT noise is transmitted from said near-end half-duplex communication device on a terminal end while data is travelling upstream on said half-duplex transmission path from a terminal end to a central office end, the device does not receive data, and, on the other hand, during a period when the FEXT noise is transmitted from the far-end half-duplex communication device on the central office end while data is travelling downstream on the half-duplex transmission path from said central office end to the terminal end, said device receives a data transmission, and in addition, optimally corrects the transmission path characteristics containing the FEXT noise based on equalizing coefficients in said FEXT noise coefficient table applied to said equalizers.

13. The digital communication device according to claim 11, wherein said digital communication device is a central office end device for transmitting after synchronizing communications between said half-duplex communication devices, and during a period when the NEXT noise is transmitted from said near-end half-duplex communication device on the central office end while data is travelling downstream on said half-duplex transmission path from a central office end to a terminal end, said device does not receive data, and on the other hand, during a period when the FEXT noise is transmitted from said far-end half-duplex communication device on the terminal end while data is travelling upstream on said half-duplex transmission path from the terminal end to the central office end, said device receives data, and in addition, corrects transmission path characteristics containing the FEXT noise based on equalizing coefficients in said FEXT noise coefficient table applied to said equalizers.

14. The digital communication device according to claim 11 further comprising,
   a detecting and determining section for detecting the noise transmitted from said half-duplex communication device, and determining whether it is in a FEXT noise domain; wherein,
      based on a determination output from said detecting and determining section, in the case of the FEXT noise, said equalizers optimally correct the transmission path characteristics based on equalizing coefficient from said FEXT noise coefficient table.

15. A modem device for demodulating a signal from a communication line where noises are transmitted from a plurality of half-duplex communication devices via a half-duplex transmission path, the communication devices being comprised of a near-end half-duplex communication device on near side to the modem device and a far-end half-duplex communication device on far side, the half-duplex transmission path having a near-end cross talk (NEXT) period and a far-end cross talk (FEXT) period, comprising:
   a NEXT noise coefficient table storing a plurality of equalizing coefficients for correcting transmission path characteristics for the NEXT period where a NEXT noise is transmitted from the near-end half-duplex communication device;
   a far-end cross talk (FEXT) noise coefficient table storing a plurality of equalizing coefficients for correcting a transmission path characteristics for the FEXT period where a FEXT noise is transmitted from the far-end half-duplex communication device;
   an equalizer which equalizes the received signal with the equalizing coefficients stored in one of the noise coefficient tables, wherein the equalizer selectively uses the equalizing coefficients depending on the period which the received signal belongs.

16. The modem device according to claim 15, wherein the equalizer is a time domain equalizer.

17. The modem device according to claim 15, wherein the equalizer is a frequency domain equalizer.

18. The modem device according to claim 15, wherein a near-end half-duplex communication device and a far-end half-duplex communication device are connected with TCM-ISDN (Time Compression Multiplexing-Integrated Services Digital Network) and the communication line is a DSL (Digital Subscriber Line).

* * * * *

UNITED STATES PATENT AND TRADEMARK OFFICE
CERTIFICATE OF CORRECTION

| | |
|---|---|
| PATENT NO. | : 6,975,677 B2 |
| APPLICATION NO. | : 09/445298 |
| DATED | : December 13, 2005 |
| INVENTOR(S) | : Wataru Matsumoto |

It is certified that error appears in the above-identified patent and that said Letters Patent is hereby corrected as shown below:

Title Page, Item (22)

The line reading "PCT Filed: March 3, 1999" should read --PCT Filed: March 30, 1999--

Signed and Sealed this

Seventh Day of July, 2009

JOHN DOLL
*Acting Director of the United States Patent and Trademark Office*